(12) United States Patent
An

(10) Patent No.: US 9,128,219 B2
(45) Date of Patent: Sep. 8, 2015

(54) SHIFT INDICATOR WITH DIRECT AND EDGE-LIT ILLUMINATION

(71) Applicant: Hyundai Motor Company, Seoul (KR)

(72) Inventor: Jae Hyun An, Seosan-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 195 days.

(21) Appl. No.: 13/712,899

(22) Filed: Dec. 12, 2012

(65) Prior Publication Data

US 2014/0098516 A1    Apr. 10, 2014

(30) Foreign Application Priority Data

Oct. 8, 2012  (KR) .................... 10-2012-0111551

(51) Int. Cl.
*B60Q 1/56* (2006.01)
*F21V 8/00* (2006.01)
*B60K 37/02* (2006.01)
*B60K 35/00* (2006.01)

(52) U.S. Cl.
CPC .............. *G02B 6/0011* (2013.01); *B60K 35/00* (2013.01); *B60K 37/02* (2013.01); *G02B 6/006* (2013.01); *G02B 6/0036* (2013.01); *B60K 2350/2039* (2013.01)

(58) Field of Classification Search
USPC .......... 362/23.09, 23.1, 23.16, 612, 491, 511; 116/28.1; 349/68
See application file for complete search history.

(56) References Cited

U.S. PATENT DOCUMENTS

| | | | |
|---|---|---|---|
| 6,601,961 B1 | 8/2003 | Masaki | |
| 6,842,204 B1* | 1/2005 | Johnson | 349/74 |
| 2010/0277673 A1* | 11/2010 | Hoelen et al. | 349/68 |

FOREIGN PATENT DOCUMENTS

| | | |
|---|---|---|
| JP | 2003-11690 A | 1/2003 |
| KR | 10-2009-0014810 A | 2/2009 |
| KR | 10-2009-0114079 A | 11/2009 |

* cited by examiner

*Primary Examiner* — Ismael Negron
(74) *Attorney, Agent, or Firm* — Morgan, Lewis & Bockius LLP

(57) ABSTRACT

A shift indicator for a vehicle includes a light-transmissive lens with a plurality of characters or symbols; a light guide panel arranged on a lower side of the lens; a side light emitting body for projecting light into a side of the light guide panel; and a plurality of lower light emitting bodies provided at the positions corresponding to the characters or symbols on a lower side of the light guide panel. The character or symbols are illuminated with various colors indicating the respective shifting status of the vehicle.

5 Claims, 3 Drawing Sheets

DEPTH OF DENT PORTION : REGION 4 > REGION 3 > REGION 2 > REGION 1

SHIFT INDICATOR WITH DIRECT AND EDGE-LIT ILLUMINATION

CROSS-REFERENCE TO RELATED APPLICATION

The present application claims priority of Korean Patent Application Number 10-2012-0111551 filed Oct. 8, 2012, the entire contents of which application is incorporated herein for all purposes by this reference.

BACKGROUND OF INVENTION

1. Field of Invention

The present invention relates to a shifting position display apparatus of a vehicle, to a technology for displaying a selecting position of a shift lever with on-off light.

2. Description of Related Art

Generally, a shift lever is provided in indoor room of a vehicle for a driver's shift operation wherein the shift lever is configured to be converted generally into the positions of P, R, N, D, 2, L, etc., so that the operation state of the shift lever is displayed on a position adjacent to a passage through which the shift lever is moved for a driver to recognize accurately the operation state of the shift lever.

The shifting position display apparatus as described-above, serves to improve beauty of indoor room of a vehicle as well as to indicate accurately the position selected by the shift lever wherein recently it tends to direct positively brilliant and elegant atmosphere using light.

According to a related art, a shifting position display apparatus that is light-emitted by using illuminating technology needs light-emitting bodies such as light-emitting diodes as many as the number of the commonly displayed shift ranges or more in order to display a plurality of shifting ranges as various colors wherein electric circuits for controlling the light-emitting bodies become complicated inevitably.

Accordingly, there needs a technology that relatively smaller number of the light-emitting bodies are used and as a result a complexity of the electric circuit for driving the light-emitting bodies is reduced to implement identical luxurious feeling of a vehicle while saving cost and decreasing manufacturing processes.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to solve the above-described problems associated with prior art. Various aspects of the present invention provide for a shifting position display apparatus of a vehicle that various colors are illuminated on a character portion for displaying the respective shifting ranges to implement luxurious feeling of a vehicle greater than same level vehicle while relatively smaller number of the light-emitting bodies are used and as a result a complexity of the electric circuit for driving the light-emitting bodies is reduced to save cost and reduce manufacturing processes.

Various aspects of the present invention provide for a shifting position display apparatus of a vehicle including: a lens which is light-transmissive and on which a plurality of characters or symbols are displayed; a light guide panel that is arranged on a lower side of the lens to be overlapped therewith; a side light emitting body for illuminating light from a side of the light guide panel toward the light guide panel; and a plurality of lower light emitting bodies which are provided at the positions corresponding to the characters or symbols on a lower side of the light guide panel.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
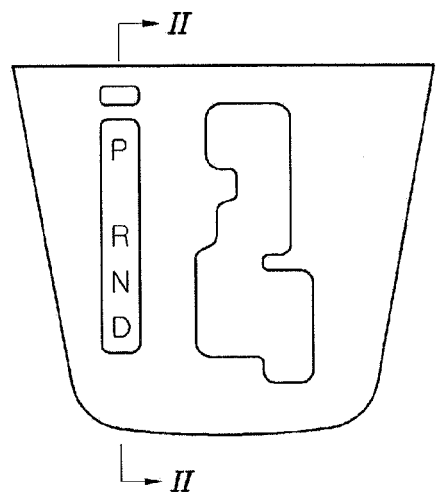
FIG. 1 is a view illustrating an outer appearance of an exemplary shifting position display apparatus according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIGS. 1 to 6, a shifting position display apparatus of a vehicle according to the present invention includes: a lens 1 which is light-transmissive and on which a plurality of characters or symbols are displayed; a light guide panel 3 that is arranged on a lower side of the lens 1 to be overlapped therewith; a side light emitting body 5 for illuminating light from a side of the light guide panel 3 toward the light guide panel 3; and a plurality of lower light emitting bodies 7 which are provided at the positions corresponding to the characters or symbols on a lower side of the light guide panel 3.

That is, characters or symbols for displaying a shifting range are displayed and light to be diffused is supplied to the lens 1 through the light guide panel 3 wherein the light is supplied to the light guide panel 3 from the side light emitting body 5 to diffuse and disperse the light toward the whole light guide panel 3, and further the lower light emitting body 7 supplies directly light to the respective characters or symbols of the lens 1 and thus the corresponding characters or symbols of various colors are displayed on the lens 1 in a wholly luxurious light emitting state through the light concentrated wholly or locally on the light guide panel 3.

Here, a plurality of dent portions 9 a sectional face thickness of which decreases to one side are provided on the light guide panel 3 at every locations corresponding to the character or symbol of the lens 1.

Figure 4:
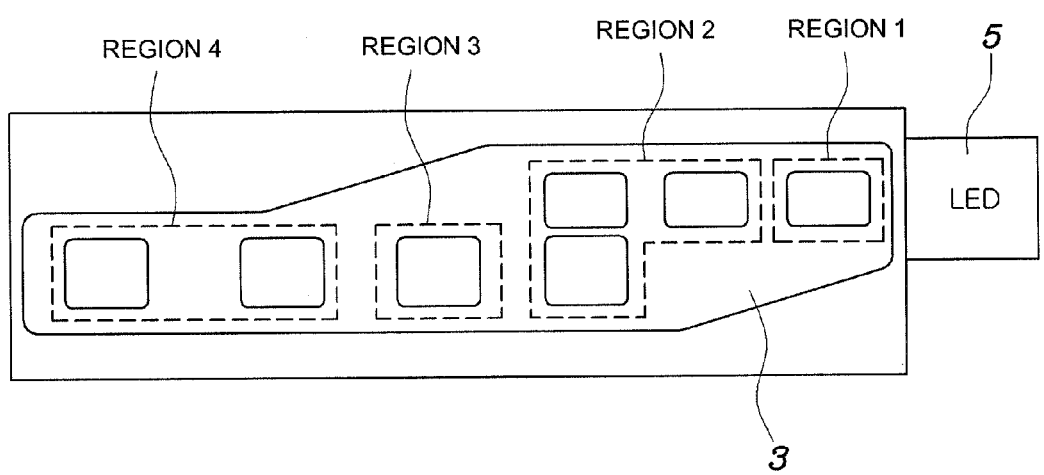
FIG. 4 is a view illustrating examples of region separations of dent portions formed on the light guide panel as shown in FIG. 2.
Figure 5:
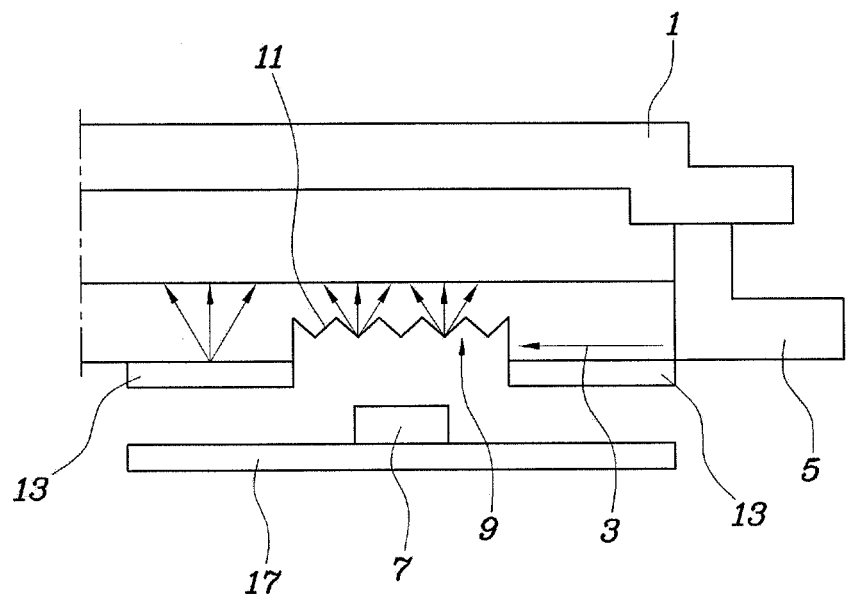
FIG. 5 is a view illustrating a state where basic colors are expressed by a side light emitting body.
Figure 6:
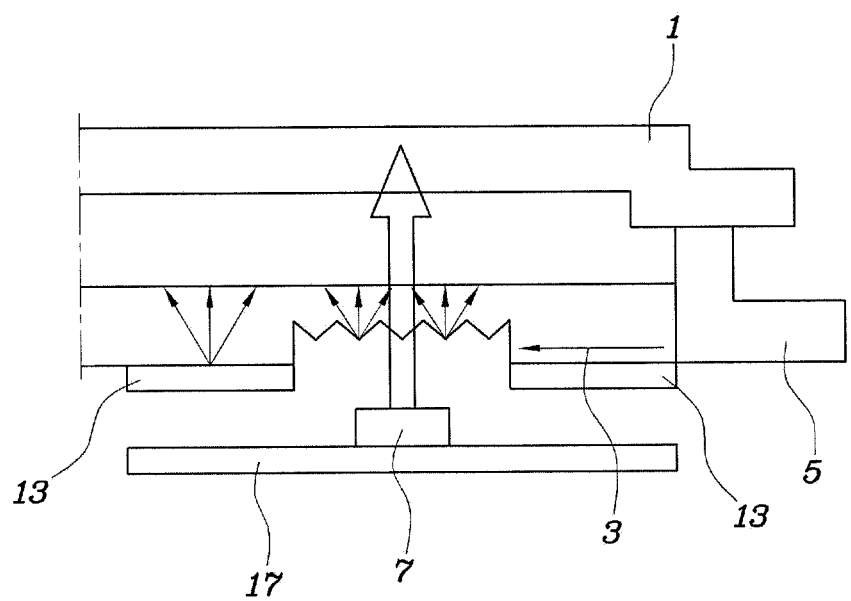
FIG. 6 is view illustrating a state where various colors are expressed by the side light emitting body and a lower light emitting body.

In various embodiments, the dent portions 9 are provided on a lower side of the light guide panel 3 and a sectional face thickness of the light guide panel 3 decreases from a lower side toward an upper side thereof, and as shown in FIG. 4, the denting depth of the dent portion becomes gradually deeper in accordance to the distance spaced from the side light emitting body 5 which is determined per region.

The depth of the dent portion 9 that becomes gradually deeper in accordance to the distance space from the side light emitting body 5 serves such that the light emitted from the side light emitting body 5 is diffused and reflected to illuminate the light of a wholly similar level to an upper side of the light guide panel 3, irrespective of the spaced distance, and thus the light of an uniform level is illuminated toward an upper side of the light guide panel 3 even though small number of the side light emitting bodies 5 are used.

An embossing 11 of a plurality of convexo-concaves is formed on the dent portion 9 of the light guide panel 3 to diffuse smooth the light incident on the dent portion 9.

A shield layer 13 is further provided on a lower side of the light guide panel 3 to be overlapped therewith except for the dent portion 9 for shielding the light from the lower light emitting body 7 and reflecting the light from the side light emitting body 5, and the shield layer 13 may be overlapped with the light guide panel 3 as a separate plate or applied to the light guide panel 3. Of course, the present invention may be implemented without the shield layer 13.

The side light emitting body 5 and the lower light emitting body 7 are configured to emit the light of different colors, respectively wherein the lower light emitting bodies 7 are configured to emit light of at least one colors and thus the light of various colors are displayed on the lens 1 to direct luxurious atmosphere.

Figure 2:
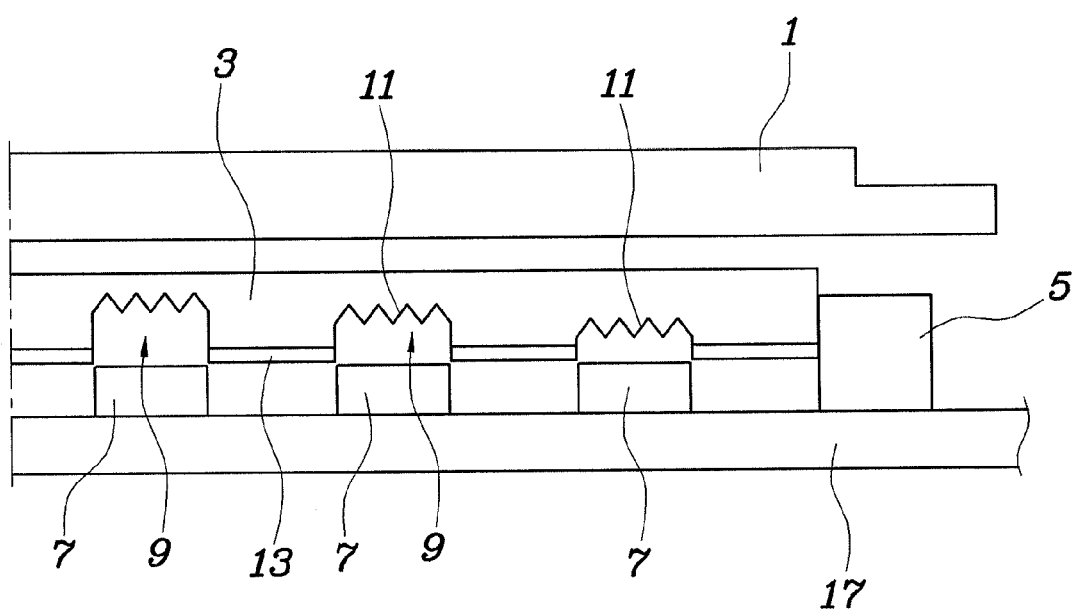
FIG. 2 is a sectional view, taken along line II-II of FIG. 1.
Figure 3:
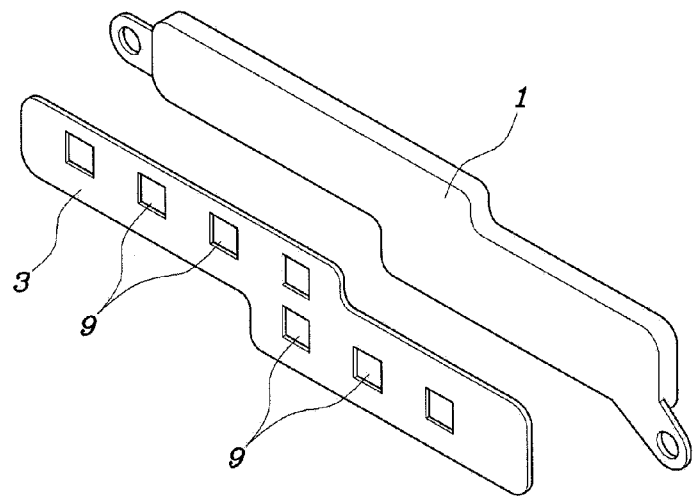
FIG. 3 is a perspective view illustrating a lens and a light guide panel as shown in FIG. 2.

A lamp or light emitting diode may be used in the side light emitting body 5 and the lower light emitting body 7, and as shown FIG. 2, a circuit board for driving the side light emitting body 5 and a circuit board 17 for driving the lower light emitting body 7 may be provided separately or a single circuit board may be provided.

According to the present invention, various colors are illuminated on a character portion for displaying the respective shifting ranges to implement luxurious feeling of a vehicle greater than same level vehicle while relatively smaller number of the light-emitting bodies are used and as a result a complexity of the electric circuit for driving the light-emitting bodies is reduced to save cost and reduce manufacturing processes.

For convenience in explanation and accurate definition in the appended claims, the terms upper or lower, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A shifting position display apparatus of a vehicle, comprising:
    a lens which is light-transmissive and on which a plurality of characters or symbols are displayed;
    a light guide panel that is arranged on a lower side of the lens and overlapping the lens;
    a side light emitting body for illuminating light from a side of the light guide panel toward the light guide panel; and
    a plurality of lower light emitting bodies provided at the positions corresponding to the characters or symbols on a lower side of the light guide panel,
    wherein a plurality of dent portions to diffuse light of the side light emitting body, are provided on a lower side of the light guide panel, and the dent portions of the light guide panel are configured such that a sectional face thickness of the light guide panel decreases to one side at every positions corresponding to the characters or symbols of the lens.

2. The shifting position display apparatus of a vehicle of claim 1, wherein a shield layer is further provided on a lower side of the light guide panel to be overlapped therewith except for the areas of decreased section face thickness for shielding the light from the lower light emitting body and reflecting the light from the side light emitting body.

3. The shifting position display apparatus of a vehicle of claim 1, wherein the side light emitting body and the lower light emitting body are configured to emit the light of different colors, respectively wherein the lower light emitting bodies are configured to emit light of at least one colors.

4. The shifting position display apparatus of a vehicle of claim 1, a denting depth of the dent portion becomes gradually deeper in accordance to the distance spaced from the side light emitting body which is determined per region.

5. The shifting position display apparatus of a vehicle of claim 4, wherein an embossing of a plurality of convexo-concaves is formed on the dent portion of the light guide panel.

\* \* \* \* \*